US011456992B2

(12) United States Patent
Albrecht et al.

(10) Patent No.: US 11,456,992 B2
(45) Date of Patent: Sep. 27, 2022

(54) METHOD FOR AUTOMATICALLY CONFIGURING A ROUTER, METHOD FOR AUTOMATIC ADDRESS CONFIGURATION, ROUTER, COMPUTER PROGRAM AND COMPUTER-READABLE MEDIUM

(71) Applicant: Siemens Aktiengesellschaft, Munich (DE)

(72) Inventors: Harald Albrecht, Nuremberg (DE); Melanie Ehlis, Nuremberg (DE); Stephan Höme, Schwabach (DE); Thomas Talanis, Heroldsbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 5 days.

(21) Appl. No.: 17/273,353

(22) PCT Filed: Aug. 29, 2019

(86) PCT No.: PCT/EP2019/073054
§ 371 (c)(1),
(2) Date: Mar. 4, 2021

(87) PCT Pub. No.: WO2020/048857
PCT Pub. Date: Mar. 12, 2020

(65) Prior Publication Data
US 2021/0211405 A1 Jul. 8, 2021

(30) Foreign Application Priority Data
Sep. 5, 2018 (EP) .................................... 18192748

(51) Int. Cl.
*H04L 61/5014* (2022.01)
*H04L 61/5076* (2022.01)
(Continued)

(52) U.S. Cl.
CPC ...... *H04L 61/5014* (2022.05); *H04L 41/0809* (2013.01); *H04L 61/5076* (2022.05); *H04L 2101/659* (2022.05)

(58) Field of Classification Search
None
See application file for complete search history.

(56) References Cited

U.S. PATENT DOCUMENTS

| 10,069,789 B2 | 9/2018 | Albrecht et al. |
| 2004/0246948 A1 | 12/2004 | Lee et al. |

(Continued)

FOREIGN PATENT DOCUMENTS

| CN | 105897460 | 8/2016 | |
| EP | 3091714 | 11/2016 | |
| WO | WO-0169887 A2 * | 9/2001 | ............. H04L 29/06 |

OTHER PUBLICATIONS

PCT International Search Report dated Nov. 13, 2019 based on PCT/EP2019/073054 filed Aug. 29, 2019.

(Continued)

*Primary Examiner* — Kenny S Lin
(74) *Attorney, Agent, or Firm* — Cozen O'Connor

(57) ABSTRACT

A method for automatic address configuration, router, computer program, computer-readable medium and method for automatically configuring a router that has an upstream interface, connected or connectable to a higher-level subnetwork and/or a higher-level router, and a downstream interface, connected or connectable to a lower-level subnetwork, wherein whether the router receives, on the upstream interface, messages providing notification of at least one domain as part of a DNS search list option, is monitored and, if the message is not received over a prescribed period, a DNS island mode is automatically activated in which the DNS zone of a local DNS server of the router is configured using a predefined island domain, and a transmission mod- (Continued)

ule of the router is prompted to send a message via the downstream interface, which message includes the preconfigured island domain as part of a DNS search list option, preferably an address of the downstream interface.

28 Claims, 2 Drawing Sheets

(51) Int. Cl.
*H04L 41/0806* (2022.01)
*H04L 101/659* (2022.01)

(56) References Cited

U.S. PATENT DOCUMENTS

| | | |
|---|---|---|
| 2013/0297754 A1 | 11/2013 | Wentink |
| 2014/0146735 A1* | 5/2014 | Poola ................ H04L 12/4633 370/312 |
| 2016/0241511 A1 | 8/2016 | Albrecht |
| 2016/0255175 A1 | 9/2016 | Albrecht et al. |

OTHER PUBLICATIONS

Office Action dated Aug. 30, 2021 issued in Chinese Patent Application No. 201980057898.7.
Pjeong J. et al.: "RFC 6106—IPv6 Router Advertisement Options for DNS Configuration", 2010.
Miles et al: "RFC 6221—Lightweight DHCPv6 Relay Agent", 2011.

* cited by examiner

METHOD FOR AUTOMATICALLY CONFIGURING A ROUTER, METHOD FOR AUTOMATIC ADDRESS CONFIGURATION, ROUTER, COMPUTER PROGRAM AND COMPUTER-READABLE MEDIUM

CROSS-REFERENCE TO RELATED APPLICATIONS

This is a U.S. national stage of application No. PCT/EP2019/073054 filed 29 Aug. 2019. Priority is claimed on European Application No. 18192748.4 filed 5 Sep. 2018, the content of which is incorporated herein by reference in its entirety.

1. FIELD OF THE INVENTION

The invention relates to a method for automatically configuring a router, a method for automatic address configuration, a router, a computer program and a non-transitory computer-readable medium.

2. DESCRIPTION OF THE RELATED ART

Mechanical engineers and equipment manufacturers, particularly from the field of automation engineering, would also like to be able to commission their machines in ever simpler fashion and hence at continually lower costs in future. The decentralized autoconfiguration mechanism "Stateless Address Autoconfiguration" (SLAAC) (see "Request For Comments" (RFC) 4862 and RFC 4862) of IPv6 allows individual subscribers to autonomously provide themselves with their own unique IPv6 addresses. This simplifies the previous network configuration of machines, because correct address configuration is not required of mechanical engineers.

An important commissioning case particularly for mechanical engineers is what is known as the island case. In such a case, the individual components of a machine, for example, components or devices of an automation installation, are networked to one another. Furthermore, there is also at least one engineering system connected to the machine network. However, there is no connection to other networks and there is particularly a lack of any "infrastructure", such as a router or a name server. Here, the machine network forms an island network.

In the IPv6 context, it is particularly important for in particular mechanical engineers to be immediately able to work solely with names instead of "long" binary IPv6 addresses.

In a name service, in particular a DNS service, it is normally only global IPv6 addresses, i.e., only GUAs or ULAs, that are linked to names.

There is then a problem if a standard application, for example a web browser or an Open Platform Communications (OPC) Unified Architecture (UA) client, is supposed or needs to access one of the automation devices via IPv6. The autoconfiguration (SLAAC) admittedly means that all of the devices have IPv6 addresses. However, without an IPv6 router, these are what are known as link-local addresses (LLAs), as are dealt with in RFC 7404, for example.

Merely link-local addresses differ, in terms of their handling and at the programming interfaces, from the global IPv6 addresses (Global Unicast Addresses—GUAs and Unique Local Addresses—ULAs, see RFC 4193) and also from IPv4 addresses because LLAs imperatively require a further parameter that denotes the respective IPv6 interface at which the IPv6 LLA is supposed to be used (see RFC 4291 and RFC 3493). While quite a few network tools, such as ping6, traceroute and ssh, support the IPv6 LLAs, there is a lack of LLA support, on the other hand, for web browsers and many third-party libraries. The required standard for how the necessary interface descriptors actually needs to be presented in a URL also does not exist.

Precisely this open context, in particular usability that is not just selective, would be very important in the applicant's view. A solution is needed that makes the IPv6 added value available in particular to mechanical engineers, even without any IT knowledge whatsoever.

From the field of home applications, it is known for example that home routers afford largely transparent management of the home network, even for IT laymen, beyond the pure modem functions.

The applicant knows that home routers exist that have a static local home domain in which the devices in the home network can be registered based on the device names (what are known as the host names) transmitted by them during DHCPv4 registration, and subsequently requests can be responded to. The home domain can only be quiered in the home network itself and is neither visible nor addressable from outside. This domain is furthermore statically preconfigured and permanently present. It is also imperative that the home devices register on the home router via DHCP.

EP 3 001 714 A1 discloses a method for providing a name service in an industrial automation system and a communication device for performing the method. Communication devices of an industrial automation system use a name service component to check whether the respective communication device has an assigned device name with a topological or hierarchic name component that denotes a spatial or hierarchic arrangement of the respective device. If the result of this check is positive, then the communication devices each treat their assigned device name as a complete device name. If the check has a negative outcome, on the other hand, then the communication devices independently generate their complete device name from topological or hierarchic name components distributed via messages containing router announcements and from a name component that is unique within their respective subnetwork.

Particularly in an industrial setting, it is true that devices are often not technically equipped for DHCP. This often applies to automation devices, for example. One of the reasons for this is that DHCP is geared specifically to the home and office sectors.

SUMMARY OF THE INVENTION

In view of the foregoing, it is therefore an object of the present invention to provide a way for network subscribers in an industrial network, even if they are not equipped for DHCP, to be able to be addressed using names instead of addresses at all times, even if the associated network is at least temporarily in an island mode, in particular with no connection to a name server.

This and other objects and advantages are achieved in accordance with the invention by a method for automatically configuring a router in a network, in particular an industrial network, where the router has at least one upstream interface connected or connectable to a higher-level subnetwork and/or a higher-level router, and at least one downstream interface connected or connectable to a lower-level subnetwork, where monitoring is performed to determine whether the router receives on the at least one upstream interface messages, in particular router advertisement messages and/or DHCP messages, which are used to announce at least one domain, particularly as part of a DNS search list option, and if no such message was received over a prescribed period then a DNS island mode is automatically activated in which the DNS zone of a local DNS server of the router is configured using a predefined island domain, in particular stored on the router, and a transmitting module of the router is prompted to send via at least one downstream interface at least one message, in particular at least one router advertisement message, comprising the preconfigured island domain, in particular as part of a DNS search list option, and preferably an address of the downstream interface.

It is also an object of the invention to provide a router having at least one upstream interface and at least one downstream interface, where the router is configured to monitor whether it receives on the at least one upstream interface, messages, in particular router advertisement messages and/or DHCP messages, which are used to announce at least one domain, in particular as part of a DNS search list option, and so as, if no such message was received over a prescribed period, to automatically activate a DNS island mode in which the DNS zone of a local DNS server of the router is configured using a predefined island domain, in particular stored on the router, and a transmitting module of the router is prompted to use at least one downstream interface to send at least one message, in particular at least one router advertisement message, comprising the preconfigured island domain, in particular as part of a DNS search list option, and preferably an address of the downstream interface.

In other words, the present invention provides for the use of a router that is configured to actively monitor whether a domain is announced from a higher-level network or by a higher-level router or name server, and, if this is not the case, to then automatically activate a DNS island mode. In this mode, in particular both the DNS zone for the local DNS server of the router and the DNS search list for the transmitting module, which list is in particular a router advertiser, and preferably the DNS server IPv6 address are configured automatically. An automatic, adaptive change between island mode and infrastructure mode is therefore possible. In the island mode, the DNS zone (cf. in particular RFC 1034 and RFC 1035) and hence also the DNS search list (see RFC 8106) used is a preconfigured DNS domain. Purely by way of illustration, "kunde.elc." may be mentioned for this.

The DNS domain is in particular one as defined by RFC 7719.

The invention allows an island mode to be detected automatically and the DNS service and in particular router advertisements to be configured accordingly. In particular within the context of a first commissioning of automation components, for example, there is already the possibility of emulating an infrastructure that is expected to be available to a customer later on. Furthermore, it becomes possible to separate from a network infrastructure and later reintegrate network parts for which there is a higher-level router in accordance with the invention, for example, individual production cells, at any time. Automatic configuration is effected over the period of separation.

The messages that are sent via at least one downstream interface and that have a domain and preferably the address of the (respective) downstream interface can be used by subscribers from lower-level networks to provide themselves with a particularly fully qualified domain name (FQDN, in particular as defined by RFC 7719). The address of the downstream interface can be particularly used for registration in the DNS server.

The DNS island mode can be activated in this case either in reaction to no messages, in particular router advertisement messages, at all being received on the at least one upstream interface of the router over the prescribed period or in reaction to messages, in particular router advertisement messages, certainly being received on at least one upstream interface of the router but not being used to announce a domain, in particular not comprising a DNS search list preferably as defined by RFC 8106.

A router in this context, in particular as defined by RFC 4861, is intended to be understood to mean any node (or any device) that forwards packets that are not explicitly addressed to it.

A router can be, for example, a (separate) device or a (separate) hardware component that is configured to perform this function. It should be understood it is also possible for a router to be available as a "software router" or "soft router", for example, in the form of a computer program or a computer program collection that is stored on a device designed to execute same, such as a PC or another computing device or any other device having a processor and memory. A router or the router function can also be integrated, for example, in a controller, such as a programmable logic controller (PLC) of an automation system or in another device, either in the form of hardware or in the form of software.

The term router within the context of the present application covers all of the aforementioned options, in particular including "soft routers" and devices that actually perform other functions or are used for another purpose, but also undertake a router function, i.e., also forward data that are not explicitly addressed to them. For example, an automation device, for example, an in particular programmable logic controller, with a router function can also be considered to be a router in accordance with the present invention, or, if it incorporates a separate device that is configured accordingly, such a controller comprises a router in accordance with the present invention.

An upstream interface of a router is in particular an interface that points in the direction of at least one higher-level subnetwork and/or router. A downstream interface is in particular one that points in the direction of at least one lower-level network or subnetwork.

A router normally has at least one upstream interface and at least one downstream interface. Alternatively, it may be that a router has only a single (physical) interface, and the distinction between upstream and downstream is made solely on a software basis. The interface used can be a port of a router.

DNS information can be learned via router advertisement messages arriving on an upstream interface, for example. It is also possible for DNS information to preferably arrive from the DHCP server concomitantly as part of a prefix delegation (in particular in accordance with RFC 3633). Accordingly, monitoring is performed both for whether router advertisement messages that are used to announce at least one domain arrive and for whether DHCP messages that are used to announce at least one domain arrive.

In a particularly preferred embodiment of the method in accordance the invention, if, in particular in the DNS island mode, a message that is used to announce at least one domain, in particular as part of a DNS search list option, is received on the at least one upstream interface then there is an automatic change to a DNS normal mode in which the DNS zone of the local DNS server of the router is configured using the at least one domain from the message received on the upstream interface, and a transmitting module of the router is prompted to use at least one downstream interface to send at least one message comprising the at least one domain from the message received on the at least one upstream interface, in particular as part of a DNS search list option, and preferably an address of the downstream interface.

The router in accordance with the invention is accordingly preferably configured so as, if, in particular in the DNS island mode, a message that is used to announce at least one domain, in particular as part of a DNS search list option, is received on the at least one upstream interface, to automatically change to a DNS normal mode in which the DNS zone of the local DNS server is configured using the at least one domain from the message received on the at least one upstream interface, and a transmitting module of the router is prompted to use at least one downstream interface to send at least one message comprising the at least one domain from the message received on the at least one upstream interface, in particular as part of a DNS search list option, and preferably an address of the downstream interface.

In accordance with these embodiments, as soon as at least one domain is announced (again) in particular by a higher-level router, the DNS island mode is also automatically terminated again. Outside the island mode, in the DNS normal mode, that DNS domain that is learned from higher-level messages, in particular router advertisement messages, is then automatically used in particular as a DNS zone and DNS search list.

If a router has more than one downstream interface, then there can be provision for a name, in particular host name, of the respective downstream interface to be sent via the respective downstream interface together with the island domain in the DNS island mode and/or together with the at least one domain received on the at least one upstream interface in the DNS normal mode. There is then in particular provision for the name of the respective downstream interface to precede the island domain or the domain received on the at least one upstream interface. This allows different domains to be announced to different subnetworks connected to different downstream interfaces of a router.

Preferably, it is additionally possible to use the mechanism disclosed in EP 3 091 714 A1 from Siemens AG, in which a unique domain is formed from the learned domain and a name assigned to the router or, if the router has multiple downstream interfaces, to the respective downstream interface. Purely by way of illustration, "Maschinenbauer.de." may be cited for a learned name and "ibs.elchbox" may be cited for the name of a router or downstream interface, in which case the unique domain "ibs.elchbox-.maschinenbauer.de." would be obtained.

The address of the DNS server, which is preferably contained in the at least one message sent via the at least one downstream interface, is sent in particular as part of a DNS server option, preferably in accordance with RFC 8106.

The method in accordance with the disclosed embodiment of the invention, the router further comprises a DNS island detection module, and the DNS island detection module monitors whether messages, in particular router advertisement messages, comprising at least one domain, preferably as part of a DNS search list option, are received on the at least one upstream interface. Alternatively or additionally, the router to can also comprise a DNS island configuration module and for the latter to configure the DNS zone of the local DNS server using the predefined domain in the DNS island mode or using the at least one domain received on the at least one upstream interface in the DNS normal mode, and/or to prompt the transmitting module to send the at least one message with the predefined domain in the DNS island mode or with the at least one domain received on the at least one upstream interface and preferably the address of the downstream interface in the DNS normal mode.

In an embodiment, the router further comprises a DNS island detection module, and the DNS island detection module is configured to monitor whether messages comprising at least one domain, in particular as part of a DNS search list option, are received on the at least one upstream interface. Alternatively or additionally, the router in accordance with another embodiment comprises a DNS island configuration module and the DNS island configuration module is configured to configure the DNS zone of the local DNS server using the predefined domain in the DNS island mode or using the at least one domain received on the at least one upstream interface in the DNS normal mode, and/or to prompt the transmitting module to send the at least one message with the predefined domain in the DNS island mode or with the at least one domain received on the at least one upstream interface and preferably the address of the downstream interface in the DNS normal mode.

In a further particularly preferred refinement of the method according to the invention, monitoring is performed to determine whether messages, in particular DHCP messages, via which at least one IPv6 prefix is delegated, particularly in accordance with RFC 3633, are received on the at least one upstream interface, and if no such message was received over a prescribed period then an IPv6 island mode is automatically activated in which a transmitting module of the router is prompted to use at least one downstream interface to send at least one message, in particular at least one router advertisement message, comprising an island prefix, where if no prefix was successfully delegated to date then a predefined island prefix, in particular stored on the router, is used, and if a previously delegated prefix is available then this prefix that is still available is used as the island prefix.

In a preferred embodiment, the router in accordance with a further embodiment of the invention is accordingly configured to monitor whether messages, in particular DHCP messages, via which at least one IPv6 prefix is delegated, in particular in accordance with RFC 3633, are received on the at least one upstream interface, and if no such message was received over a prescribed period, to automatically activate an IPv6 island mode in which a transmitting module of the router is prompted to use at least one downstream interface to send at least one message, in particular at least one router advertisement message, comprising an island prefix, where if no prefix was successfully delegated to date then a predefined island prefix, in particular stored on the router, is used, and if a previously delegated prefix is available then this prefix that is still available is used as island prefix.

In accordance with this particularly advantageous embodiment, active monitoring is performed not only for whether a DNS domain is learned from higher-level messages, in particular router advertisement messages, but also for whether IPv6 prefixes are received or a prefix delegation, in particular as defined by RFC 3633, was successful or has failed. An IPv6 island mode is automatically activated based on the result of this check. This mode is firstly activated if no messages at all are received on the at least one upstream interface, or else if messages are certainly received but do not successfully delegate an IPv6 prefix. This can be the case, for example, if no prefix is allocated for a request, or a renewal or extension request for a prefix already obtained is denied.

This embodiment also makes it possible for users, such as automation users, to be able to use IPv6 without needing to have IT know-how.

The IPv6 and DNS island modes are functionally separate, which is why the method in accordance with the disclosed embodiments of the invention can also be performed using home routers, for example, which certainly have control over the IPv6 prefix delegation but in some cases do not provide a domain for a lower-level network. For example, such a home router can then be connected via a router in accordance with the disclosed embodiments of the invention. If IPv6 prefixes are delegated successfully, then the router in accordance with the invention will operate in the IPv6 normal mode. If no domain is provided, it will operate in the DNS island mode at the same time.

In a further embodiment, the router in accordance with the invention, in particular a DHCPv6 client of the router in accordance with the invention, is configured to store received prefixes for a respectively prescribed period and then to erase them. As a rule, a prefix or (if more than one prefix is delegated to a router) prefixes is or are stored in a router, in particular by/in a DHCPv6 client thereof for a prescribed period of time. The period of time expediently corresponds to a service life associated with the prefix(es) that was transmitted to the router with the prefix(es). At least one new prefix can be requested before one or more currently stored prefixes "expire". This does not always have to be successful, however, which means that it may also happen that no prefix is (currently) available in a router. There is also (still) no prefix available in the router before one or more first prefixes are received, such as during a first commissioning.

The principle of what is known as "prefix delegation" is also known from RFC 3316. According to this, a hierarchically higher-level router (known as the "delegating router") assigns one or more subnetworks to a hierarchically lower-level router (known as the "requesting router").

The RFC 3633 furthermore describes a method for delegating IPv6 prefixes based on DHCPv6. Here, IPv6 prefixes are released for distribution by a requesting router, which comprises or forms or acts as a DHCP client, at the request of a delegating router that is or acts as a DHCP server. One or more prefixes that were delegated based on DHCPv6 using the method in accordance with RFC 3633 are preferably received in the course of the method in accordance with the invention or by the router in accordance with the invention.

The router in accordance with disclosed embodiments of the invention preferably has at least one DHCPv6 client.

As far as the island prefix to be used in the IPv6 island mode is concerned, there are in particular two available options. If to date (in particular since a restart) no DHCPv6 prefix was able to be successfully leased (for example, on a restart), then the predefined substitute prefix, in particular stored in the router, can be used as island prefix. Purely by way of illustration, fdaa:dead:beef:cafe::/64 may be cited for a prefix. If a DHCPv6 prefix exists, on the other hand, this can continue to be used (in particular even if it has already expired or was not successfully renewed/extended), in particular to allow stable network operation.

In further preferred embodiment of the method in accordance with the invention if, in particular in the IPv6 island mode, a message, in particular DHCP message, by means of which at least one IPv6 prefix is delegated, preferably in accordance with RFC 3633, is received on the at least one upstream interface then there is an automatic change to an IPv6 normal mode in which a transmitting module of the router is prompted to use at least one downstream interface to send at least one message comprising at least one IPv6 prefix from the message received on the at least one upstream interface.

Accordingly, in an embodiment, the router in accordance with the invention is configured so as, if a message, in particular DHCP message, by means of which at least one IPv6 prefix is delegated, preferably in accordance with RFC 3633, is received on the at least one upstream interface, to automatically change to an IPv6 normal mode in which a transmitting module of the router is prompted to use at least one downstream interface to send at least one message comprising at least one IPv6 prefix from the message received on the at least one upstream interface.

Preferably, the island prefix is sent in the form of prefix information, in particular in accordance with RFC 4861, in the at least one message, preferably together with at least one SLAAC flag (in particular A=1).

In an embodiment, the router in accordance with the invention is accordingly configured to send the island prefix in the form of a prefix information option, in particular in accordance with RFC 4861, in the at least one message, preferably together with at least one SLAAC flag.

Particularly preferably, prefixes are sent in the messages together with the SLAAC flags "A" (address autoconfiguration) and "L" (on-link).

It should be noted that the at least one message, in particular router advertisement message, that is sent via at least one downstream interface in the DNS island or DNS normal mode and comprises a domain and preferably the address of the DNS server, and the at least one message, in particular router advertisement message, that is sent via at least one downstream interface in the IPv6 island or IPv6 normal mode and comprises a prefix, can preferably be the same at least one message. This means that a domain (island domain or domain received via the at least one upstream interface) and a prefix (island prefix or prefix received via the at least one upstream interface) can each be announced jointly to one or more lower-level networks in a message, in particular router advertisement message.

Furthermore, there can be provision for messages, in particular router advertisement messages, that comprise an (island) domain and in particular a prefix to be sent via at least one downstream interface cyclically and/or on request.

In in accordance with a further embodiment, the router comprises an IPv6 island detection module, and the IPv6 island detection module monitors whether messages via which at least one IPv6 prefix is delegated are received on the at least one upstream interface, and/or the router comprises an IPv6 island configuration module, and the IPv6 island configuration module prompts the transmitting module to send the at least one message comprising an island prefix in the IPv6 island mode and to send the at least one message comprising at least one IPv6 prefix from the message received on the at least one upstream interface in particular in the IPv6 normal mode.

Accordingly, the router in accordance with the invention can be distinguished in that it comprises an IPv6 island detection module that is configured to monitor whether messages via which at least one IPv6 prefix is delegated are received on the at least one upstream interface, and/or the router comprises an IPv6 island configuration module, and the IPv6 island configuration module is configured to prompt the transmitting module to send the at least one message comprising an island prefix in the IPv6 island mode and to send the at least one message comprising at least one IPv6 prefix from the message received on the at least one upstream interface in particular in the IPv6 normal mode.

The IPv6 island configuration module is n particularly configured to react to a change to the island mode by configuring a prefix for the downstream network.

The DNS island detection module and/or the DNS island configuration module and/or the IPv6 island detection module and/or the IPv6 island configuration module can each be (purely) software implemented, for example, provided by a program that executes on general hardware of the router that is available anyway, or (purely) hardware implemented or comprise or be provided by a combination of software and hardware, in particular hardware provided specifically for the respective module or the modules.

The transmitting module is in particular designed and/or set up for correctly handling the router advertisement protocol. The transmitting module can comprise a combination of hardware and software or else be purely software implemented or purely hardware implemented. The transmitting module can comprise or be provided by for example a router advertisement daemon (RAD or radvd), possibly in combination with suitable hardware.

The transmitting module is preferably automatically configured by a DNS island configuration module and/or an IPv6 island configuration module to send at least one message, in particular router advertisement message, with an island domain and preferably with the address of the downstream interface and/or with an island prefix in the island mode.

Preferably, automatic configuration of the transmitting module can be effected, for example, via suitable software, such as a router advertisement daemon. An example that may be cited are the router advertisement daemons "radvd" or "RAD" (in particular Linux) and "rtadvd" (in particular OpenBSD). In particular, router advertisement daemons can be instructed via configuration files as to which information is supposed to be transmitted as part of router advertisement messages.

For example, in particular a DNS island configuration module and/or an IPv6 island configuration module can create a configuration file containing at least one island domain or a domain received from a higher-level router and/or an island prefix or a successfully delegated prefix, because it is also possible for at least one template file ("template") to be used. It is then possible, for example, for a wildcard in a template file to be filled in with an appropriate domain or an appropriate prefix. A DNS and/or IPv6 island configuration module can also have at least one template file/template firmly programmed in.

A configuration file can be stored at a known/agreed location in particular on the at least one lower-level router. It can be created or have new information (new content) written to it in particular by a DNS island configuration module and/or an IPv6 island configuration module. The transmitting module, in particular a router advertisement daemon thereof, is then preferably prompted to (re)read a freshly created or modified configuration file. This is possible, for example, by stopping and restarting in particular the daemon. Following the adoption of a new/modified configuration file, it is possible for router advertisement messages to be sent according to the new/modified configuration file.

The DNS island detection module and/or the DNS island configuration module and/or the IPv6 island detection module and/or the IPv6 island configuration module can each be (purely) software implemented, for example, provided by a program that executes on general hardware of the router that is available anyway, or (purely) hardware implemented or else comprise or be provided by a combination of software and hardware, in particular hardware provided specifically for the respective module or the modules.

It is a further subject of the invention to provide a method for automatic address configuration of a subscriber of a network, in particular an industrial network, in which at least one network subscriber receives at least one message, in particular a router advertisement message, from a higher-level router that is or was configured by performing the method in accordance with the above-described disclosed embodiments, and the at least one subscriber uses the message received from the router to assign itself a name, in particular a fully qualified domain name, and preferably a global IPv6 address.

A network subscriber of an industrial network can be present, for example, in the form of an automation device.

The at least one network subscriber is in particular one that is not technically equipped for DHCP.

Furthermore, it is an object of the invention to provide a computer program comprising program code means for performing the steps of the method in accordance with the invention for automatically configuring a router or of the method in accordance with the invention for automatic address configuration of a subscriber of a network, in particular an industrial network.

Finally, it is also an object of the invention to provide a non-transitory computer-readable medium comprising program instructions that, when executed by a processor on at least one computer, prompt the at least one computer to perform the steps of the method in accordance with the disclosed embodiments of the invention for automatically configuring a router or of the method in accordance with disclosed embodiments of the invention for automatic address configuration of a subscriber of a network, in particular an industrial network.

The non-transitory computer-readable medium can be, for example, a CD-ROM or DVD or a USB or flash memory. It should be noted that a non-transitory computer-readable medium is not intended to be understood to mean exclusively a physical medium, but rather a computer-readable medium, for example, in the form of a data stream and/or of a signal that represents a data stream can also be present.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention will become clear on the basis of the description of embodiments according to the invention that follows with reference to the accompanying drawings, in which.

DETAILED DESCRIPTION OF THE EXEMPLARY EMBODIMENTS

Figure 1:
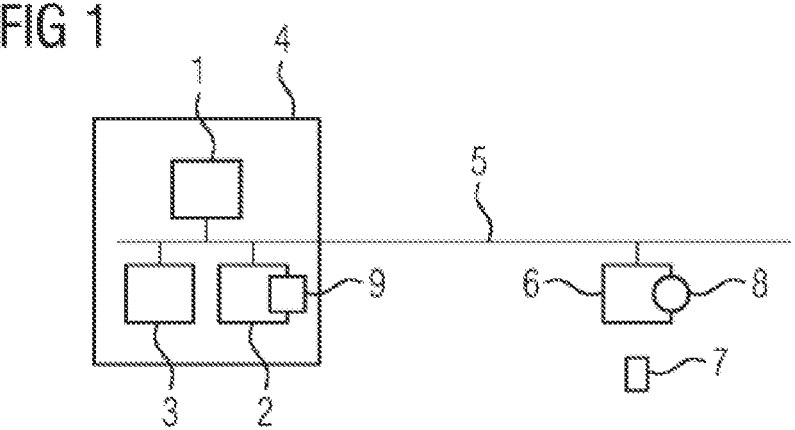
FIG. 1 is a purely schematic depiction of an automation network in the island mode in accordance with the invention.

FIG. 1 is a purely schematic depiction of a commissioning case that is particularly important to mechanical engineers. Multiple automation components 1, 2, 3 of a machine 4 are networked to one another via a network 5. The automation components in the depicted exemplary embodiment are specifically formed by a programmable logic controller 1 (abbreviated to PLC below) and two I/O devices 2, 3.

Furthermore, an engineering tool 6 is also connected to the machine network 5.

There is no connection to other networks and there is in particular a lack of any "infrastructure", such as a router or a name server. The machine network 5 therefore forms an island network.

The decentralized autoconfiguration mechanism ("Stateless Address Autoconfiguration" (SLAAC), see RFC 4862) of IPv6 allows the individual subscribers of a network to autonomously provide themselves with their own unique IPv6 addresses. This simplifies the network configuration of machines, because correct address configuration is not required of mechanical engineers.

In the present case, the subscribers 1, 2, 3, 6 have each used SLAAC to autonomously provide themselves with their own unique IPv6 address after having been activated. The autoconfiguration means that all of the subscribers 1, 2, 3, 6 have IPv6 addresses. However, without the missing infrastructure, in particular without an IPv6 router, these are what are known as link-local addresses (LLAs), as are dealt with in RFC 7404, for example.

Problems arise if a mechanical engineer, who is depicted in FIG. 1 only schematically by a block element provided with the reference sign 7, wishes for example to use a web browser or an OPC UA client 8 to access one or more of the automation components 1, 2, 3, such as the I/O device 2, which comprises a web server 9.

The merely link-local addresses (LLAs), owing to the autoconfiguration, of the components 1, 2, 3, 6 differ, in terms of their handling and at the programming interfaces, from global IPv6 addresses (Global Unicast Addresses—GUAs and Unique Local Addresses—ULAs, see RFC 4193) and also from IPv4 addresses because LLAs imperatively require a further parameter that denotes the respective IPv6 interface at which the IPv6 LLA is supposed to be used (see RFC 4291 and RFC 3493). There is a complete lack of LLA support in particular for web browsers and many third-party libraries.

Figure 2:
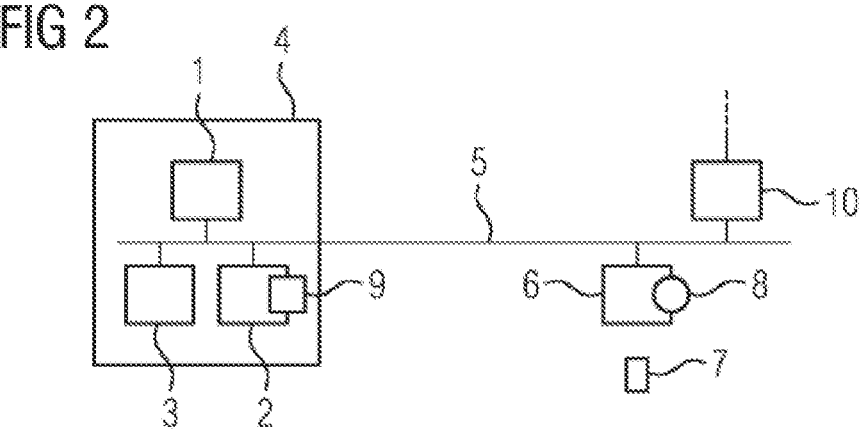
FIG. 2 is a purely schematic depiction of the network from FIG. 1, for which there is a higher-level exemplary embodiment of a router in accordance with the invention.

This problem is overcome by connecting to the island network 5 an exemplary embodiment of a router 10 in accordance with the invention, which forms a router 10 that is on a higher level than the island network (see FIG. 2). It should be noted that the dashed line departing upward from the router 10 in FIG. 2 is supposed to clarify that the router 10 can provide a higher-level upstream network.

The router 10 is configured to detect the island mode and to perform an autoconfiguration in such a mode, which will be discussed below.

The router 10 specifically comprises an upstream interface 11 and a downstream interface 12. The upstream interface 11 can be used to connect the router to a higher-level network or router and the downstream interface 12 is used to connect the router 10 to the island network 5. It should be noted that there is no connection to a higher-level network or router via the upstream interface 11 in the island mode.

The router 10 comprises a transmitting module 13, a DNS server 14 and a DHCPv6 client 15.

The transmitting module 13 is configured to correctly handle the router advertisement protocol and is formed in the present case by a router advertisement daemon, specifically an radvd. These components also have conventional, previously known routers.

The DNS server 14 provides a name service for (a) network(s) that is/are on a lower level than the router 10 in a manner known per se. A name service is intended to be understood in a manner known per se to mean a service that assigns names, in particular domain names, of devices, computers, services, etc. to (numerical) IP addresses, for example IPv4 or IPv6 IP addresses. The domain name system (DNS) is one such service whose main task is usually to respond to requests for name resolution, i.e., translation of names into addresses, in particular in IP-based networks. Standards associated with the DNS are in particular RFC 1034 and RFC 1035. A server that provides a name service is also referred to as a name service server (nameserver); in the case of DNS it is also referred to as a DNS server.

The DHCPv6 client 15 is used in a manner known per se to obtain IPv6 configuration information from a DHCPv6 server.

Besides the conventional components, the router 10 furthermore comprises an IPv6 island detection module 16, an IPv6 island configuration module 17, a DNS island detection module 18 and a DNS island configuration module 19.

The router 10, specifically the IPv6 island detection module 16 thereof, is configured to monitor or detect whether DHCP messages via which at least one IPv6 prefix is delegated in accordance with RFC 3633 are received on the upstream interface 11, and, if no such message was received over a prescribed period (possibly no messages at all have arrived), to automatically activate an IPv6 island mode and to signal the IPv6 island mode to the IPv6 island configuration module 17.

The IPv6 island configuration module 17 is configured so as, in the IPv6 island mode, to automatically configure the transmitting module 13 and to prompt it to use the downstream interface 12 to send router advertisement messages with an island prefix, where if no prefix was successfully delegated to date then a preconfigured island prefix stored on the router 10 is used, and if a previously delegated, possibly already expired prefix is available then this prefix that is still available is used as island prefix.

In the present case of the first commissioning and the lack of an infrastructure, no DHCP messages at all arrive on the upstream interface 11 of the router 10, and there is also not yet a delegated IPv6 prefix in existence, in particular the DHCPv6 client does not yet store one. After the prescribed period has elapsed without DHCP messages having been received on the upstream interface 11, the preconfigured island prefix is therefore used.

A router advertisement daemon can be instructed in a manner known per se via configuration files as to which information is supposed to be transmitted as part of router advertisement messages.

In the present case, an appropriate configuration of the radvd is effected, with a configuration file being created by the IPv6 island configuration module 17, or an existing configuration file being modified. The transmitting module 13 is prompted to adopt the configuration created or modified by the IPv6 island configuration module 17. This can be accomplished by virtue of the transmitting module 13 being prompted to adopt the new configuration by reading in the configuration file. The transmitting module 13 can be stopped and restarted for this purpose, for example.

The router 10 is furthermore configured so as, if IPv6 prefixes are learned via the upstream interface 11, to automatically forward them to the lower-level network 5. It thus automatically detects an IPv6 normal mode and then caters for an appropriate configuration.

Specifically, the router 10 is configured so as, if it receives on the upstream interface 11 in the IPv6 island mode a DHCP message via which at least one IPv6 prefix is successfully delegated in accordance with RFC 3633, to automatically change to an IPv6 normal mode in which the transmitting module 13 of the router 10 is prompted to use the downstream interface 12 to send at least one message comprising the at least one IPv6 prefix from the message received on the upstream interface 11. IPv6 prefixes learned from higher-level messages are therefore automatically forwarded to the lower-level island network 5 and made known therein in the IPv6 normal mode.

The IPv6 normal mode or the change thereto is detected via the IPv6 island detection module 16, which is configured accordingly. The IPv6 island detection module 16 signals the IPv6 normal mode to the IPv6 island configuration module 17, and the IPv6 island configuration module 17 caters for the above autoconfiguration of the transmitting module 13.

Island prefixes or prefixes learned via the upstream interface 11 in the IPv6 normal mode are sent in the form of a prefix information option (see RFC 4861) in the router advertisement messages sent via the downstream interface 12, together with the SLAAC flags "A" (address autoconfiguration) and "L" (on-link).

Figure 3:
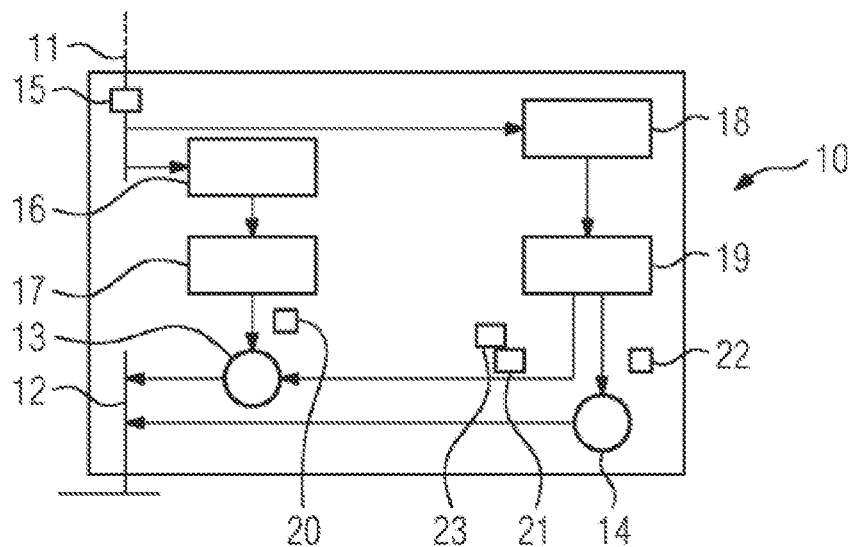
FIG. 3 is a purely schematic enlarged depiction of the router from FIG. 2.

In FIG. 3, the prefix and A/L flags are indicated only schematically as block element 20.

Arrows connecting the upstream interface 11 to the IPv6 island detection module 16, the IPv6 island detection module 16 to the IPv6 island configuration module 17, the IPv6 island configuration module 17 to the transmitting module 13 and the transmitting module 13 to the downstream interface 12 clarify the processes.

The router 10 is furthermore configured to monitor whether it receives on the upstream interface 11 messages, specifically router advertisement or else DHCP messages, which are used to announce at least one domain as part of a DNS search list option 21, and in order, if no such message is or was received over a prescribed period, to automatically activate a DNS island mode in which the DNS zone 22 of the local DNS server 14 is configured using a preconfigured island domain stored on the router, and the transmitting module 13 is prompted to use the downstream interface 12 to send at least one router advertisement message comprising the preconfigured island domain as part of a DNS search list option 21, and an address 23 of the downstream interface 12.

The router 10 is furthermore configured so as, if a message that is used to announce at least one domain as part of a DNS search list option is received on the upstream interface 11 in the DNS island mode, to automatically change to a DNS normal mode in which the DNS zone 22 of the local DNS server 14 is configured using at least one domain from the message received on the upstream interface 11, and to prompt the transmitting module 13 to use the downstream interface 12 to send at least one message comprising at least one domain from the message received on the upstream interface 11 as part of a DNS search list option 21 and an address 22 of the downstream interface 12.

These functions are undertaken by the DNS island detection module 18 and the DNS island configuration module 19, which are each configured accordingly. Specifically, the DNS island detection module 18 monitors whether applicable router advertisement messages arrive on the upstream interface 11, and activates and signals the DNS island mode to the DNS island configuration module 19, which then configures the DNS server 14 and the transmitting module 13 accordingly. As far as the configuration of the transmitting module 13 is concerned, reference should be made to the above explanations in regard to the configuration thereof by the IPv6 island configuration module 17.

Outside the island mode it is therefore not the preconfigured DNS domain 22 that is used as DNS zone 22 and hence also as DNS search list 21 but rather the DNS domain that is learned from higher-level router advertisement messages.

Presented below purely by way of illustration are two sections from possible configuration files for the transmitting module 13, specifically for the router advertisement daemon, once for the case in which the IPv6 and DNS island modes are active (referred to as island mode below), i.e., when neither IPv6 prefixes nor domains are learned on the upstream interface 11, and once for the case in which the IPv6 and DNS normal modes are active, i.e., that this information is or was learned from upstream router advertisement messages (also referred to as infrastructure mode):

Island Mode
radvd.conf
island mode
interface downstream {
. . .
island prefix
prefix 2001:db8:4711:4711::/64{ . . . };
island DNS server address=IP address downstream interface
RDNSS 2001:db8:4711:4711::1 { . . . };
island DNS search list/suffix
DNSSL island.local { . . . };
};
Infrastructure Mode
radvd.conf
infrastructure mode
interface downstream {
. . .
prefix learned by prefix delegation and allocated to the
"downstream" interface by the DHCPv6 client
prefix 2001:db8:0:1::/64{ . . . };
island DNS server address=IP address downstream interface
RDNSS 2001:db8:0:1::1{ . . . };
island DNS search list/suffix
DNSSL cell42.plant2.regiowest.company.com { . . . };
};

These illustrative configuration files may each have been created or appropriately adapted via the IPv6 island configuration module 17 and the DNS island configuration module 19, in particular in each case by adding the prefix and the DNS search list.

Reading-in the configuration files can be brought about, as noted above, in a manner known per se, for example, by restarting the router advertisement daemon.

As can be seen, separate router advertisement messages are not sent via the downstream interface 12 for prefixes and domains, but rather the router advertisement messages sent each comprise both a prefix and a domain (island prefix and island domain, or prefix received on the upstream interface 11 and domain received on the upstream interface 11).

On request, it is additionally possible to use the mechanism disclosed in EP 3 091 714 A1 from Siemens AG, in which a unique domain is formed from the installation context, in particular a learnt domain and a name assigned to the router. Purely by way of illustration, "Maschinenbauer.de." may be cited for a learnt domain and "ibs.elchbox" may be cited for the name of a router, in which case the unique domain "ibs.elchbox.maschinenbauer.de." would be obtained.

The network subscribers 1, 2, 3, 6 receive router advertisement messages that the router 10 sends via the downstream interface 12, and they can use the received messages to assign themselves or provide themselves with a fully qualified domain name (FQDN, in particular as defined by RFC 7719) and a global IPv6 address. The global IPv6 address can be allocated using the IPv6 prefix and the FQDN can be allocated using the DNS search list 21. The address of the DNS server 14 is also announced. As a result, the subscribers 1, 2, 3, 6 can register in the DNS server 14.

The router advertisement messages are sent via the downstream interface 12 in the IPv6 island mode and in the IPv6 normal mode and in the DNS island mode and in the DNS normal mode, and they comprise an IPv6 prefix, A/L flags, an IPv6 address of the DNS server 14 and a DNS search list in all modes of operation. As a result, the network subscribers 1, 2, 3, 6 from the network 5 can provide themselves with FQDNs and global IPv6 addresses, and can register, at all times, even if the network 5 is in an island mode, i.e., forms an island network. This is also possible for the subscribers 1, 2, 3, 6 if they are not technically equipped for DHCP, as is often the case in an industrial setting, in particular in automation engineering.

Access to subscribers 1, 2, 3, 6 using IPv6 by a standard application, such as a web browser or an OPC UA client 8, is possible without any problem at all times.

There is an automatic change between the island mode and the normal mode. As a result, the network 5 can also be temporarily separated from a network infrastructure and later reconnected without any problem.

The configuration is effected completely automatically in all modes of operation. Accordingly, it requires no effort and no IT know-how from users.

Figure 4:
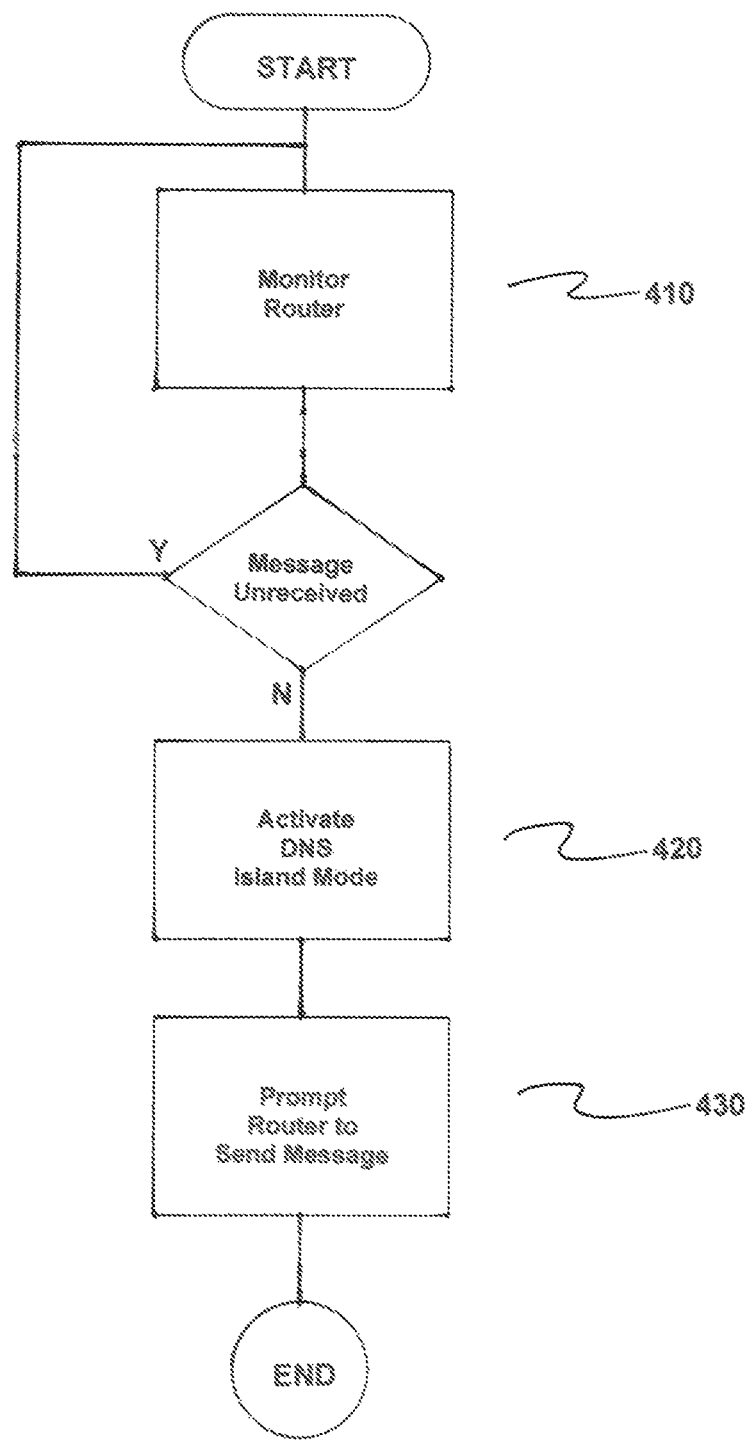
FIG. 4 is a flowchart of the method in accordance with the invention.

FIG. 4 is a flowchart of the method for automatically configuring a router 10 in a network 5, the router 10 including at least one upstream interface 11 connected or connectable to either a higher-level subnetwork and/or a higher-level router, and including at least one downstream interface 12 connected or connectable to a lower-level subnetwork 5. The method comprises monitoring the router to whether the router 10 receives messages on the at least one upstream interface 11 that are utilized to announce at least one domain, as indicated in step 410.

Next, a domain name system (DNS) island mode in which a DNS zone 22 of a local DNS server 14 of the router 10 is configured is automatically activated utilizing a predefined island domain if such a message is unreceived over a prescribed period, as indicated in step 420.

Next, a transmitting module 13 of the router 10 is prompted to send at least one message comprising the preconfigured island domain via at least one downstream interface 12, as indicated in step 430.

Although the invention has been illustrated and described more thoroughly in detail by means of the preferred exemplary embodiment, the invention is not limited by the disclosed examples, and other variations can be derived therefrom by a person skilled in the art without departing from the scope of protection of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for automatically configuring a router in a network, the router including at least one upstream interface connected or connectable to at least one of (i) a higher-level subnetwork and (ii) a higher-level router, and including at least one downstream interface connected or connectable to a lower-level subnetwork, the method comprising:
   monitoring the router to whether the router receives messages on the at least one upstream interface which are utilized to announce at least one domain;
   activating automatically a domain name system (DNS) island mode in which a DNS zone of a local DNS server of the router is configured utilizing a predefined island domain if such a message is unreceived over a prescribed period; and
   prompting a transmitting module of the router to send at least one message comprising the preconfigured island domain via at least one downstream interface.

2. The method as claimed in claim 1, further comprising:
   performing an automatic change to a DNS normal mode in which the DNS zone of the local DNS server of the router is configured utilizing the at least one domain from the message received on the upstream interface if a message which is used to announce at least one domain is received on the at least one upstream interface; and
   prompting a transmitting module of the router to utilize at least one downstream interface to send at least one message comprising the at least one domain from the message received on the at least one upstream interface.

3. The method as claimed in claim 2, wherein the router comprises at least one of:
   (i) a DNS island detection module, and the DNS island detection module monitors whether messages comprising at least one domain are received on the at least one upstream interface and
   (ii) a DNS island configuration module, and the DNS island configuration module at least one of configures the DNS zone of the local DNS server utilizing one of (i) the predefined domain in the DNS island mode and (ii) the at least one domain received on the at least one upstream interface in the DNS normal mode and prompts the transmitting module to send the at least one message with one of (i) the predefined domain in the DNS island mode and (ii) the at least one domain received on the at least one upstream interface in the DNS normal mode.

4. The method as claimed in claim 1, wherein the router comprises at least one of:
   (i) a DNS island detection module, and the DNS island detection module monitors whether messages comprising at least one domain are received on the at least one upstream interface and
   (ii) a DNS island configuration module, and the DNS island configuration module at least one of configures the DNS zone of the local DNS server utilizing one of (i) the predefined domain in the DNS island mode and (ii) the at least one domain received on the at least one upstream interface in the DNS normal mode and prompts the transmitting module to send the at least one message with one of (i) the predefined domain in the DNS island mode and (ii) the at least one domain received on the at least one upstream interface in the DNS normal mode.

5. The method as claimed in claim 1, further comprising:
   performing monitoring to determine whether messages via which at least one IPv6 prefix is delegated are received on the at least one upstream interface; and
   activating automatically an IPv6 island mode in which a transmitting module of the router is prompted to utilize at least one downstream interface to send at least one message comprising an island prefix if no such message was received over a prescribed period;
   wherein if no prefix was successfully delegated to date then a predefined island prefix is utilized, and if a previously delegated prefix is available then this prefix which is still available is utilized as an island prefix.

6. The method as claimed in claim 5, wherein the island prefix is sent as a prefix information option in the at least one message.

7. The method as claimed in claim 6, further comprising:
   activating automatically an IPv6 normal mode in which a transmitting module of the router is prompted to utilize at least one downstream interface to send at least one message comprising at least one IPv6 prefix from the message received on the at least one upstream interface if a message via which at least one IPV6 prefix is delegated is received on the at least one upstream interface.

8. The method as claimed in claim 6, wherein the router comprises at least one of:
   (i) an IPv6 island detection module, and the IPv6 island detection module monitors whether messages via which at least one IPv6 prefix is delegated are received on the at least one upstream interface; and
   (ii) an IPv6 island configuration module, and the IPv6 island configuration module prompts the transmitting module to send the at least one message comprising an island prefix in the IPv6 island mode.

9. The method as claimed in claim 5, further comprising:
   activating automatically an IPv6 normal mode in which a transmitting module of the router is prompted to utilize at least one downstream interface to send at least one message comprising at least one IPv6 prefix from the message received on the at least one upstream interface if a message via which at least one IPV6 prefix is delegated is received on the at least one upstream interface.

10. The method as claimed in claim 9, wherein the router comprises at least one of:
    (i) an IPv6 island detection module, and the IPv6 island detection module monitors whether messages via which at least one IPv6 prefix is delegated are received on the at least one upstream interface; and
    (ii) an IPv6 island configuration module, and the IPv6 island configuration module prompts the transmitting module to send the at least one message comprising an island prefix in the IPv6 island mode.

11. The method as claimed in claim 5, wherein the router comprises at least one of:
    (i) an IPv6 island detection module, and the IPv6 island detection module monitors whether messages via which at least one IPv6 prefix is delegated are received on the at least one upstream interface; and
    (ii) an IPv6 island configuration module, and the IPv6 island configuration module prompts the transmitting module to send the at least one message comprising an island prefix in the IPv6 island mode.

12. The method as claimed in claim 1, wherein the transmitting module of the router comprises a router advertisement daemon or is provided by such.

13. A method for automatic address configuration of a subscriber of a network, in which at least one network subscriber receives at least one message from a higher-level router which is or was configured via the method as claimed in claim 1, and the at least one subscriber utilizes the message received from the router to self-assign a name.

14. A router comprising:
    a processor; and
    memory;
    at least one upstream interface; and
    at least one downstream interface;
    wherein the router is configured to:
        monitor whether messages that are used to announce at least one domain are received on the at least one upstream interface; and
        activate automatically a domain name system (DNS) island mode in which a DNS zone of a local DNS server of the router is configured utilizing a predefined island domain if no such message was received over a prescribed period, and
        prompt a transmitting module of the router to use at least one downstream interface to send at least one message comprising the preconfigured island domain if no such message was received over the prescribed period.

15. The router as claimed in claim 14, wherein the router is further configured to:
    change automatically to a DNS normal mode in which the DNS zone of the local DNS server is configured utilizing the at least one domain from the message received on the at least one upstream interface if a message which is utilizing to announce at least one domain is received on the at least one upstream interface; and
    prompt a transmitting module of the router is prompted to us utilizing e at least one downstream interface to send at least one message comprising the at least one domain from the message received on the at least one upstream interface if the message which is utilizing to announce at least one domain is received on the at least one upstream interface.

16. The router as claimed in claim 15, wherein the router further comprises at least one of:
    (i) a DNS island detection module, and the DNS island detection module is configured to monitor whether messages comprising at least one domain are received on the at least one upstream interface; and (ii) a DNS island configuration module, and the DNS island configuration module is configured to at least one of:

(A) configure the DNS zone of the local DNS server utilizing one of (i) the predefined domain in the DNS island mode and (ii) the at least one domain received on the at least one upstream interface in the DNS normal mode and (B) prompt the transmitting module to send the at least one message with one of (i) the predefined domain in the DNS island mode and (ii) the at least one domain received on the at least one upstream interface in the DNS normal mode.

17. The router as claimed in claim 15, wherein the router is further configured to monitor whether messages via which at least one IPv6 prefix is delegated are received on the at least one upstream interface, and to automatically activate an IPv6 island mode in which a transmitting module of the router is prompted to utilize at least one downstream interface to send at least one message comprising an island prefix if no such message was received over a prescribed period; and wherein if no prefix was successfully delegated to date then a predefined island prefix is used; and wherein if a previously delegated prefix is available then this prefix that is still available is used as an island prefix.

18. The router as claimed in claim 14, wherein the router further comprises at least one of:

(i) a DNS island detection module, and the DNS island detection module is configured to monitor whether messages comprising at least one domain are received on the at least one upstream interface; and (ii) a DNS island configuration module, and the DNS island configuration module is configured to at least one of:

(A) configure the DNS zone of the local DNS server utilizing one of (i) the predefined domain in the DNS island mode and (ii) the at least one domain received on the at least one upstream interface in the DNS normal mode and (B) prompt the transmitting module to send the at least one message with one of (i) the predefined domain in the DNS island mode and (ii) the at least one domain received on the at least one upstream interface in the DNS normal mode.

19. The router as claimed in claim 18, wherein the router is further configured to monitor whether messages via which at least one IPv6 prefix is delegated are received on the at least one upstream interface, and to automatically activate an IPv6 island mode in which a transmitting module of the router is prompted to utilize at least one downstream interface to send at least one message comprising an island prefix if no such message was received over a prescribed period; and wherein if no prefix was successfully delegated to date then a predefined island prefix is used; and wherein if a previously delegated prefix is available then this prefix that is still available is used as an island prefix.

20. The router as claimed in claim 14, wherein the router is further configured to monitor whether messages via which at least one IPv6 prefix is delegated are received on the at least one upstream interface, and to automatically activate an IPv6 island mode in which a transmitting module of the router is prompted to utilize at least one downstream interface to send at least one message comprising an island prefix if no such message was received over a prescribed period; and wherein if no prefix was successfully delegated to date then a predefined island prefix is used; and wherein if a previously delegated prefix is available then this prefix that is still available is used as an island prefix.

21. The router as claimed in claim 20, wherein the router is further configured to automatically change to an IPv6 normal mode in which a transmitting module of the router is prompted to utilize at least one downstream interface to send at least one message comprising at least one IPv6 prefix from the message received on the at least one upstream interface if a message via which at least one IPv6 prefix is delegated is received on the at least one upstream interface.

22. The router as claimed in claim 21, wherein the router is further configured to send the island prefix as a prefix information option in the at least one message.

23. The router as claimed in claim 21, wherein the router further comprises at least one of:

(i) an IPv6 island detection module, and the IPv6 island detection module is configured to monitor whether messages via which at least one IPv6 prefix is delegated are received on the at least one upstream interface, and (ii) an IPv6 island configuration module, and the IPv6 island configuration module is configured to prompt the transmitting module in the IPv6 island mode to send the at least one message comprising an island prefix in the IPv6 island mode.

24. The router as claimed in claim 20, wherein the router is further configured to send the island prefix as a prefix information option in the at least one message.

25. The router as claimed in claim 24, wherein the router further comprises at least one of:

(i) an IPv6 island detection module, and the IPv6 island detection module is configured to monitor whether messages via which at least one IPv6 prefix is delegated are received on the at least one upstream interface, and (ii) an IPv6 island configuration module, and the IPv6 island configuration module is configured to prompt the transmitting module in the IPv6 island mode to send the at least one message comprising an island prefix in the IPv6 island mode.

26. The router as claimed in claim 20, wherein the router further comprises at least one of:

(i) an IPv6 island detection module, and the IPv6 island detection module is configured to monitor whether messages via which at least one IPv6 prefix is delegated are received on the at least one upstream interface, and (ii) an IPv6 island configuration module, and the IPv6 island configuration module is configured to prompt the transmitting module in the IPv6 island mode to send the at least one message comprising an island prefix in the IPv6 island mode.

27. The router as claimed in claim 14, wherein the transmitting module of the router comprises a router advertisement daemon.

28. A non-transitory computer-readable medium encoded with program instructions which, when executed by a processor on at least one computer, prompt the at least one computer to automatically configure a router in a network, the router including at least one upstream interface connected or connectable to at least one of (i) a higher-level subnetwork and (ii) a higher-level router, and including at least one downstream interface connected or connectable to a lower-level subnetwork, the program instructions comprising:
- program code for monitoring the router to whether the router receives messages on the at least one upstream interface which are utilized to announce at least one domain;
- program code for activating automatically a domain name system (DNS) island mode in which a DNS zone of a local DNS server of the router is configured utilizing a predefined island domain if such a message is unreceived over a prescribed period; and
- program code for prompting a transmitting module of the router to send at least one message comprising the preconfigured island domain via at least one downstream interface.

* * * * *